United States Patent [19]

Bolshak et al.

[11] 4,155,688
[45] May 22, 1979

[54] MACHINE FOR PRODUCING REINFORCED CAST PIECES

[75] Inventors: Nikolai I. Bolshak; Leonid B. Borislavsky; Vladimir S. Korovai, all of Nezhin Chernigovskoi oblasti, U.S.S.R.

[73] Assignee: Zavod "Nezhineselmash", U.S.S.R.

[21] Appl. No.: 877,946

[22] Filed: Feb. 15, 1978

[51] Int. Cl.² .................. B29C 27/00; B29F 1/10
[52] U.S. Cl. .................. 425/112; 425/113; 425/116; 425/121; 425/129 R
[58] Field of Search .............. 425/112, 113, 116, 121, 425/129 R

[56] References Cited

U.S. PATENT DOCUMENTS

| 2,288,899 | 7/1942 | Gits | 425/121 X |
| 3,152,433 | 10/1964 | Burbank | 425/112 X |
| 3,257,709 | 6/1966 | Fernan et al. | 425/116 X |
| 3,685,784 | 8/1972 | Spanjer | 425/116 X |

FOREIGN PATENT DOCUMENTS 1035845  8/1953  France ................... 425/116

*Primary Examiner*—Robert L. Spicer, Jr.
*Attorney, Agent, or Firm*—Steinberg & Blake

[57] ABSTRACT

A machine is disclosed for producing reinforced cast pieces on a rope, which are to be spaced apart at a desired distance along the rope. Mounted on the machine bed are half-moulds having two aligned holes to receive the rope, a mechanism for closing and opening said half-moulds, a device for pouring a material into the half-moulds, and a device for moving the rope step-by-step. The machine is also provided with a device for fluffing the rope so as to reinforce cast pieces, the device being mounted on the machine bed nearby the half-moulds. The fluffing device comprises two members having grooves which form a hole for receiving and fixing the rope while the members are closed, the hole being in alignment with the holes in the half-moulds, a mechanism for moving said members in the direction of movement of the half-moulds so as to close or open these members, and a mechanism for axially moving said members while closed until the portion of the members that faces said half-moulds enters one hole in the half-moulds, this hole being made so as to correspond to the shape and size of the entering portion of the members, the other hole of the half-moulds being adapted for fixing the rope in position.

9 Claims, 6 Drawing Figures

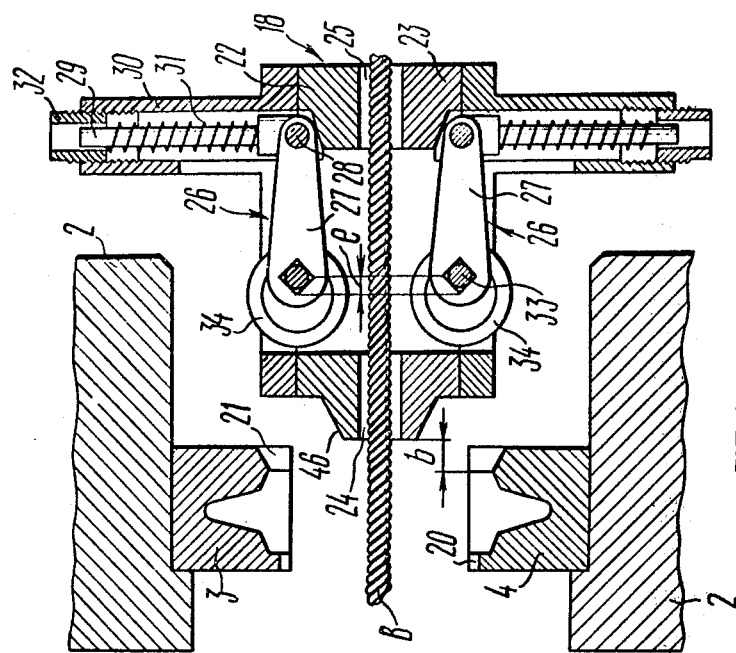
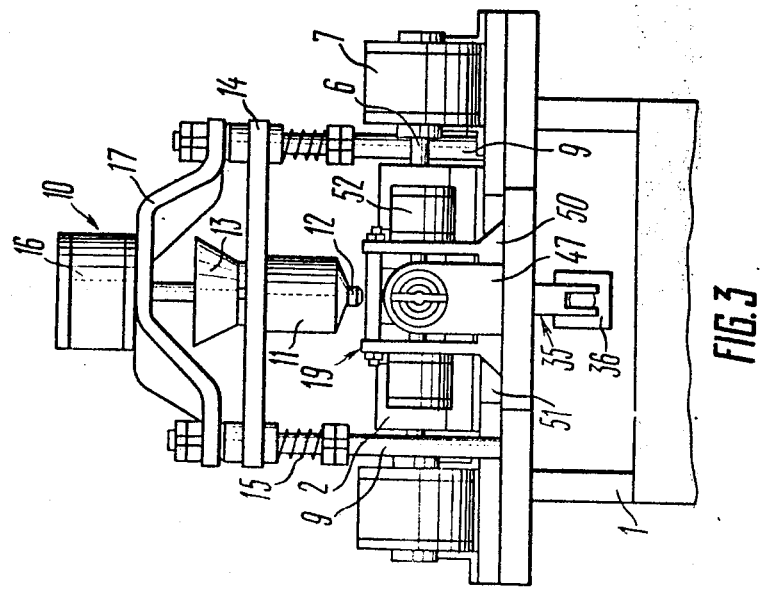

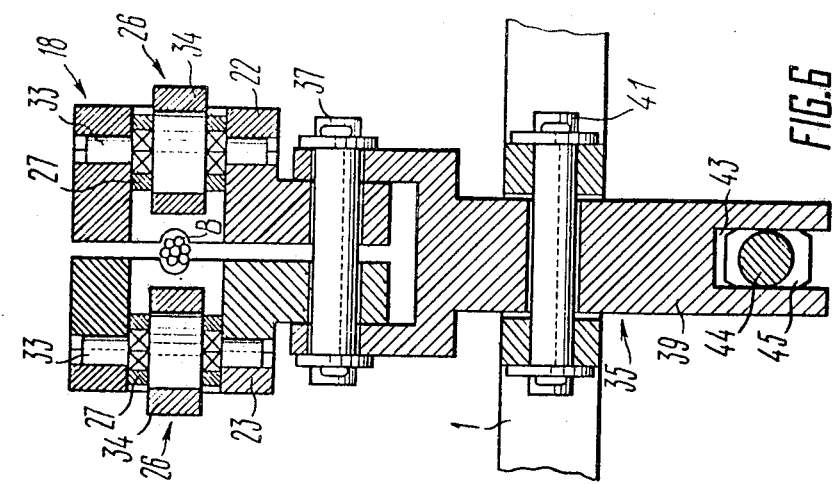
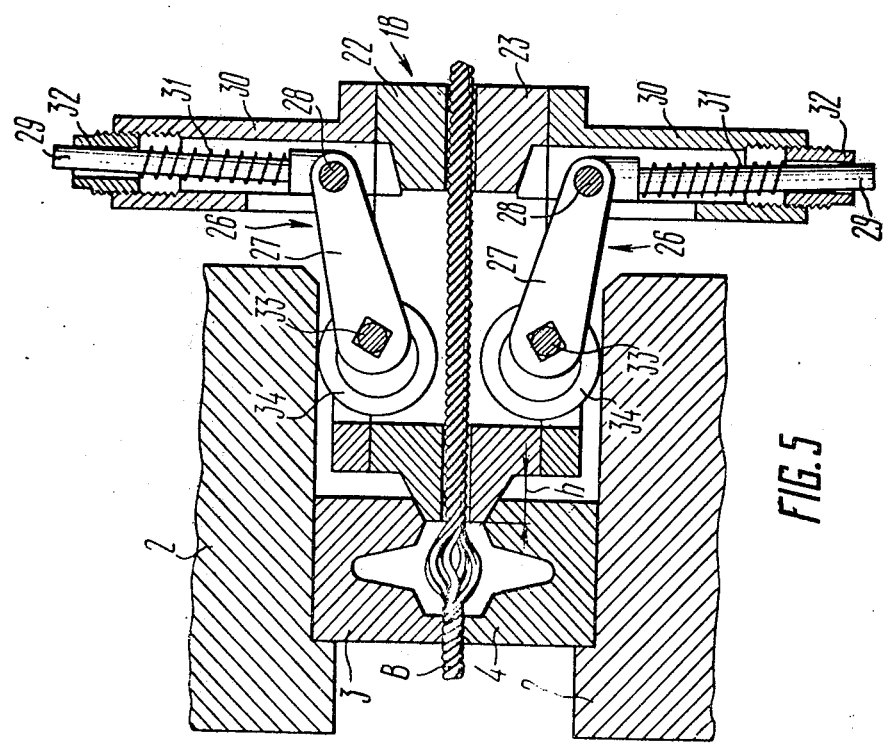

MACHINE FOR PRODUCING REINFORCED CAST PIECES

BACKGROUND OF THE INVENTION

1. Field of the Application

The present invention related to foundry and, more specifically, to machines for producing reinforced cast pieces on a rope which are to be spaced from one another at a desired distance along the rope.

The machine according to the present invention is suitable for use in the production of disc-type cast pieces carried on the ropes used as a tractive member in conveyors intended to feed forage at poultry-and-hog-breeding farms, and also feed other bulk materials in various branches of industry.

2. Description of the Prior Art

Machines for producing reinforced cast pieces on ropes are widely known. These pieces, made in the form of discs, are spaced from one another at a desired distance along the length of the rope. In the production of such tractive means, the rope is previously reinforced with metallic wire, pins, or rings on special reinforcing machines. Thereafter, the reinforced rope is transferred to a machine for producing cast pieces.

Such a machine has a bed mounting two half-moulds kinematically connected with a mechanism designed for moving the half-moulds so as to close or open them. Each half-mould is provided with two aligned grooves which form, while the half-moulds are closed, two holes for receiving the rope. A device for pouring a material to form cast pieces is disposed on the bed over the half-moulds. Also located on the bed as a device for moving the rope.

From the foregoing it follows that the process for producing a rope with discs requires various types of production equipment, that is, machines for reinforcing the rope and machines for casting discs. Hence, the need arises for a considerable floor space, and the production rates are relatively low. Moreover, the reinforcement of ropes with rings results in reduced fatigue strength of the rope because at the locations of reinforcement the rope strands are compressed. Where the rope is reinforced with pins, the shearing force arising in the operation of the rope deforms the discs along the line of action of the force with the result that the engagement of discs with the driving sprocket of the rope drive mechanism is impaired.

All these shortcomings of a rope with cast pieces produced by the above-mentioned method tend to decrease the service life of the rope.

An object of the present invention is to provide a machine having means for reinforcing a rope with its own strands.

Another object of the present invention is to reduce the shop floor space needed for the location of the equipment used for the production of ropes provided with cast pieces.

One more object of the invention is to increase productivity of making ropes with cast pieces.

Still another object of the invention is to extend the service life of a rope furnished with cast pieces.

A further object of the invention is to reduce metal content in the cast pieces.

These and other objects are accomplished by providing a machine for producing reinforced cast pieces on a rope, which are to be spaced apart a desired distance along the rope, whose bed mounts half-moulds having two aligned holes for receiving the rope, a mechanism for closing and opening said half-moulds, a device for pouring a material to form the cast pieces into the half-moulds, and a device for moving the rope step-by-step, which machine, according to the invention, is provided with a device for fluffing the rope so as to reinforce the cast pieces, said device being mounted on the bed nearby the half-moulds and comprising two members which have grooves forming a hole for receiving and fixing the rope while said members are closed, this hole being in alignment with the holes in the half-moulds, a mechanims for moving said members in the direction of movement of the half-moulds so as to close or open these members, and a mechanism for axially moving these members while they are closed until the portion of the members that faces the half-moulds enters one hole in the half-moulds, this hole being made so as to conform in shape and size to the entering portion of the members, and the other hole in the half-moulds being adapted for fixing the rope in position.

It is advisable that the mechanism for advancing the members in the direction of movement of the half-moulds include two levers each having one arm spring-loaded with relation to the respective member along the direction of swinging, and the lever per se, rigidly secured on a pivot turnable in said respective member, which pivot carries a roller eccentrically mounted thereon and acted upon by the respective half-mould while the latter is moved into the closed position.

Designed in this way, the mechanism is most simple as it allows the driving mechanism for the half-moulds to be used and the synchronism in closing and opening the half-moulds and the members of the fluffing device to be ensured.

It is also advisable that the mechanism for axially moving the parts of the fluffing device include a hinge-jointed parallelogram two joints of which are mounted on said members, and two other joints, on the bed, and also includes a power cylinder whose movable link is connected to one of the arms of the parallelogramm.

Such a mechanism is most simple in construction.

Preferably, the portion of the members that enters the hole in the half-moulds is made in the form of frustum of a cone with the smaller base facing the half-moulds.

This makes for the alignment of the holes and a snug fitting of the members entering portion to the surface of the hole of the half-moulds in the course of casting.

It is desirable that the hole in the members and the hole in the half-moulds distant from the device for fluffing the rope be made with a diameter somewhat smaller than the rope diameter.

In this way the rope can be fixed more readily and reliably in the process of fluffing and casting.

It is advisable that the device for moving the rope step-by-step include guideways for cast pieces, which guideways are mounted on the base, and a slider connected with a movable link of the power cylinder driving the fluffing device so as to be moved in the guideways, the slider carrying rope grippers adapted to be moved thereon transversely in the travelling direction of the slider.

Such construction of the device for moving the rope step-by-step makes it possible to use as a drive the power cylinder of the fluffing device, which simplifies the machine and ensures axial movement of the rope and the members of the fluffing device in synchronism.

The machine according to the invention for producing cast pieces on a rope provides for a higher output and reduces metal content in tractive members of conveyors because the reinforcement of ropes with metallic wire or pins on a separate machine is no longer necessary. In addition, the fatigue strength of ropes with cast pieces made on the machine being proposed and also the shearing strength of the cast pieces become substantially higher than those for the ropes reinforced with rings, pins, or wire.

BRIEF DESCRIPTION OF THE DRAWINGS

The invention will now be described, by way of example, with reference to the accompanying drawings, in which:

FIG. 3 is a front elevational view of the machine;

FIG. 4 is a view of half-moulds and a fluffing device whose members are opened (the location A of FIG. 2 on an enlarged scale);

FIG. 5 shows a similar view with the members of the fluffing device being closed; and FIG. 6 is a cross-section taken along the line VI—VI on an enlarged scale.

DESCRIPTION OF THE PREFERRED EMBODIMENT

Figure 1:
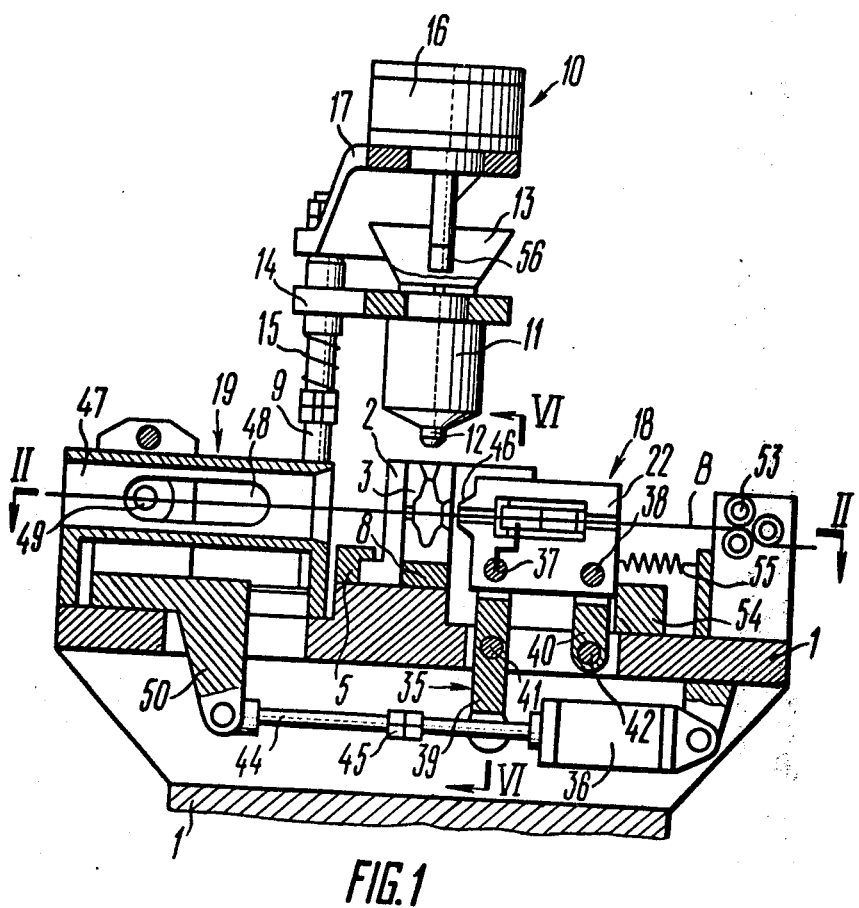
FIG. 1 shows a side elevational view of the machine for producing cast pieces on a rope.
Figure 2:
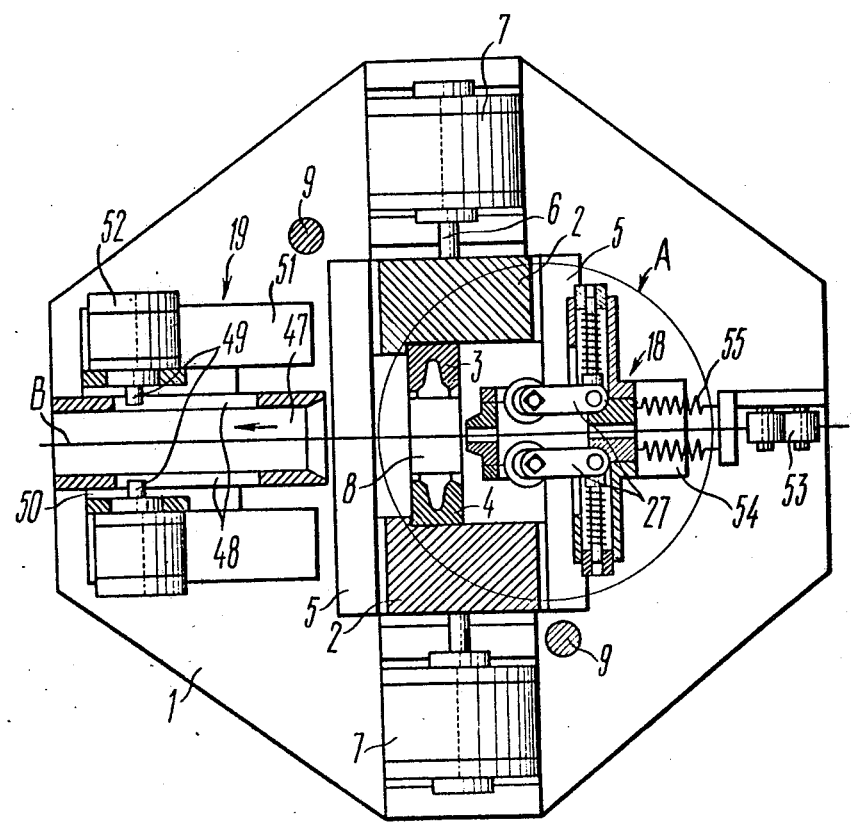
FIG. 2 is a cross-section taken along the line II—II of FIG. 1.

Referring now to FIGS. 1 and 2, the machine according to the invention for producing reinforced cast pieces on a rope B has a bed 1 carrying plates 2 with half-moulds 3 and 4 mounted thereon. The plates 2 are movable along guideways 5 secured to the bed 1. Each of the plates 2 is connected with the piston rod 6 of a corresponding power cylinder 7 located on the bed 1. The cylinders 7 define a mechanism which serves to close and open the half-moulds 3 and 4.

A stop 8 (FIG. 1) fixed to the bed 1 is intended to limit the travel of the half-moulds 3 and 4.

Mounted on the bed 1 are uprights 9 on which a device 10 for pouring a material to form cast pieces into the half-moulds 3 and 4 is accommodated. The device has a chamber 11 adapted to contain the material to be cast, with a check valve 12 and a feed hopper 13. The chamber 11 is fixed on a plate 14 located on the uprights 9 and held in the uppermost position by springs 15 fitted over the uprights 9.

To push the material to form a cast piece into the half-moulds 3 and 4, use is made of a power cylinder 16 located on a bracket 17 rigidly fastened to uprights 9.

Mounted on the bed in addition to the half-moulds 3 and 4 is a device for fluffing the rope B (FIGS. 1 and 2). By the term "fluffing" is meant an axial upsetting of the rope at the location of a cast piece so as to get the rope strands bulged and separated for forming the cast-piece reinforcement. A device 19 for moving the rope step-by-step is mounted on the bed 1 from the opposite side of the half-moulds 3 and 4.

Grooves 20 and 21 (FIG. 4), forming in the closed position of the half-moulds 3 and 4 holes designated by the same reference numerals 20 and 21, are made in the half-moulds for receiving the rope B.

The device 18 for fluffing the rope B has two members, 22 and 23. These members are disposed oppositely to each other and are provided with grooves forming, while the members are closed, holes 24 and 25 for receiving the rope B. These holes are arranged in alignment with the holes 20 and 21 in the half-moulds 3 and 4.

To close and open the members 22 and 23, there is provided a mechanism 26 with two levers 27. One arm of each lever 27 is rigidly fixed on an axle 28 hingedly connected with a rod 29 housed within a sleeve 30 which is fastened to the respective part 22 or 23. Fitted on the rod 29 is a spring 31 one end of which bears up against a nut 32, screwed into the sleeve 30 and serving to adjust pressure exerted by the spring, and the other end rests upon a shoulder made on the rod 29. Each lever 27 is rigidly secured on a pivot 33 mounted in the member 22 (23). A roller 34 acted upon by the plates 2 while closing the half-moulds 3 and 4 (FIG. 5) is free to rotate on the pivot 33. The roller 34 is offset on the pivot 33 by an amount e selected depending on the pressure of the spring 31 and the required force of gripping the rope B.

To ensure a firm grip of the rope, the hole 20 in the half-moulds 3 and 4, and the hole 24 in the members 22 and 23 are somewhat smaller in diameter than the rope B. The rope can also be gripped with other means suitable for the purpose, e.g. pins secured in the holes 20 and 24 or by means of thread made in the hole surface.

A mechanism 35 (FIG. 1) serves for moving the members 22 and 23 in the closed position axially, i.e. in the direction of the rope movement. This mechanism includes a hinge-jointed parallelogramm and a power cylinder 36. The parallelogram is fitted with pins 37 and 38 joining links 39 and 40 with the respective member 22 and 23, and pins 41 and 42 joining links 39 and 40 with the bed 1.

The projecting end of the link 39 is provided with a slot 43 (FIG. 6) through which a movable link, that is, the piston rod 44 of the power cylinder 36 extends (FIG. 1). The piston rod 44 carries adjusting nuts 45 which interact with the link 39, swinging it on the pin 41 and so moving the hinge-jointed parallelogram. As this takes place, the members 22 and 23 are moved axially until their portion 46 (FIG. 5), disposed on their side facing the half-moulds, enters the hole 21 in the half-moulds 3 and 4. The shape and size of the hole 21 conform to those of the portion 46. In this embodiment of the invention, the portion 46 and the hole 21 are made in the form of frustum of a cone. The frustum of the cone shaping the portion 46 faces the half-moulds 3 and 4 with its smaller base.

The height h of the frustum of cone is taken somewhat longer than the distance b that the members 22 and 23 travel while being closed.

Instead of the described mechanism for moving the members 22 and 23, any other mechanism capable of performing this function may be used.

Axial stepwise movement of the rope B is effected by the device 19. This device is provided with a guideway 47 (FIG. 1) for cast pieces, made as a tube and rigidly fixed on the bed 1 and have diametrically disposed through slots 48 extending lengthwise. The slots 48 serve to accommodate rope grippers 49 which are arranged on a slider 50. The slider 50 is mounted in longitudinal dovetail guideways 51 (FIG. 2) and connected to the movable link 44 of the power cylinder 36 to be driven by the latter. The connection of the slider 50 with the power cylinder 36 of the fluffing device 18 allows the movement of the members 22, 23 and the slider 50 to be synchronized. The grippers 49 are so mounted on the slider 50 as to be moved transversely to the direction of movement of the slider 50, i.e. to the movement of the rope B.

In the described embodiment of the invention, the piston rods of power cylinders 52 located at the slider 50 are used as the rope grippers 49.

The machine for producing cast pieces on a rope operates as follows.

Before starting the operation, the rope B is secured on the machine. To this end, the rope is drawn through a system of rolls 53 (FIG. 1) and through the holes 24 and 25 in the members 22 and 23 and is then fixed with the grippers 49 of the device 19, for which the power cylinders 52 are actuated. The power cylinders 7 are then brought into operation, and their movable links 6, acting upon the plates 2, close the half-moulds 3 and 4. Once the latter are closed, the rope B is fixed in the hole 20. Moreover, the plates 2 act upon the rollers 34 and turn the levers 27 together with pivots 33, so jamming the rope B in the hole 24 of the members 22 and 23. The gripping force depends on the extent of compression of springs 31 by nuts 32. As this takes place, the members 22 and 23 are withdrawn by springs 55 up to a stop 54.

Upon the closure of the half-moulds 3 and 4, the cylinders 52 are actuated for returning the rope grippers 49 to the initial position. The power cylinder 36 of the mechanism 35 is then actuated. As the piston rod 44 of the power cylinder 36 moves, the adjusting nuts 45, acting upon the link 39 of the hinge-jointed parallelogram 35, swing the links 39 and 40 on the pins 41 and 42, and the closed members 22 and 23 together with the jammed rope B move towards the half-moulds 3 and 4, entering with their face portion 46 the conical hole 21 to fit it snugly. Because of axial compression, the rope is upset and its strands become fluffed (i.e. separated). Although the members 22 and 23 move here along a curved path, its length, necessary to fluff the rope, is rather short. Therefore, this curved path differs from a straight one quite insufficiently and is readily compensated for by clearances in the joints 37 and 38 of the parallelogram. As the movable link 44 of the power cylinder 36 moves to perform fluffing of the rope B, the slider 50 with the rope grippers 49 also moves one step towards the half-moulds 3 and 4.

The power cylinder 16 of the pouring device 10 is now operated. A plunger 56 (FIG. 1) secured on the piston rod of the cylinder 16 enters the respective hole in the chamber 11 containing a molten material and moves the chamber 11 with the plate 14 till the check valve 12 touches the half-moulds 3 and 4, compressing the springs 15. Upon the contact with the half-moulds 3 and 4, the check valve 12 opens and allows the plunger 56 to build up pressure for casting the material into the half-moulds 3 and 4.

Thereafter, the power cylinder 16 is reversed to withdraw the plunger 56 to its initial position. This will cause the springs 15 to move the plate 14 together with chamber 11 away from the half-moulds 3 and 4.

The rope grippers 49 are then moved towards each other by the action of the cylinders 52.

After the material is held in the half-moulds for the required period of time, the power cylinders 7 are operated, and the half-moulds are opened. Following this, the power cylinder 36 is brought into action, and its piston rod 44, coming outwards, moves the slider 50 together with the cylinders 52 and rope grippers 49. Thereby, the rope B is moved the required step. The adjusting nuts 45, moving away together with the piston rod 44, allow the springs 55 to withdraw the members 22 and 23 up to the stop 54.

The machine according to the invention for producing cast pieces on a rope substantially raises the productivity of making tractive members and reduces their metal content. The fatigue strength of ropes with cast pieces manufactured on the proposed machine is increased 4 to 5 times compared with ropes reinforced with rings, and the shearing strength of the cast pieces is 2 to 3 times higher than that of a rope reinforced with rings or pins. Tests have shown that the machine is easy-to-handle, reliable, and compact.

What is claimed is:

1. A machine for producing reinforced cast pieces on a rope, which pieces are to be spaced apart at a desired distance along the rope, comprising:

a bed; half-moulds for obtaining cast pieces, said half-moulds being mounted on said bed so as to be moved into the closed and the open positions; a mechanism for moving said half-moulds; a device for pouring a material to form the cast pieces into said half-moulds, said device being mounted on said base; a device for moving the rope step-by-step mounted on said base; grooves made in each of said half-moulds in alignment with each other; holes formed by said grooves in the closed position of said half-moulds and intended for receiving the rope; a device for fluffing the rope at the designed locations of the cast pieces to reinforce the latter, said device being mounted on said base nearby said half-moulds and comprising: two members disposed oppositely to each other so as to be moved into the closed and the open positions, a mechanism for moving said members in the direction of movement of said half-moulds so as to close and open said members, groove made in said two members, a hole formed by said grooves in the closed position of said members to receive the rope and adapted for fixing the rope while the latter is fluffed, said hole in said two members being aligned with said holes in said half-moulds, a portion of said two members disposed on their end facing said half-moulds, said two members being adapted for axial movement, while closed, to introduce said portion into one of said holes in said half-moulds which faces said device for fluffing the rope; a mechanism for axially moving said two members while they are closed for introducing said portion of the members into one of said holes in said half-moulds, one of said holes corresponding to the shape and size of said portion in said two members that enters said hole, and the other hole in said half-moulds being adapted for fixing the rope while the latter is fluffed.

2. A machine as claimed in claim 1, wherein the mechanism for moving said members in the direction of movement of the half-moulds includes two levers each having one arm spring-loaded with relation to the respective member along the direction of swinging, and the other arm, rigidly secured on a pivot turnable in said member, which pivot carries a roller eccentrically mounted thereon and acted upon by the respective half-mould while the latter is moved into the closed position.

3. A machine as claimed in claim 1, wherein the mechanism for axially moving said members includes a hinge-jointed parallelogram two joints of which are mounted on said members, and two other joints, on the bed, and also includes a power cylinder whose movable link is connected to one of the arms of the parallelogram.

4. A machine as claimed in claim 1, wherein said portion of the members, entering said hole in the half-moulds is made as the frustum of a cone with the smaller base facing said half-moulds.

5. A machine as claimed in claim 1, wherein the hole in the members and the hole in the half-moulds distant from the device for fluffing the rope are made with a diameter somewhat smaller than the diameter of the rope.

6. A machine for producing reinforced cast pieces on a rope, which pieces are to be spaced apart a desired distance along the rope, comprising: a bed; half-moulds for obtaining cast pieces, said half-moulds being mounted on said bed so as to be moved into the closed and the open positions; a mechanism for moving said half-moulds; a device for pouring a material to form the cast pieces into said half-moulds, said device being mounted on said base; a device for moving the rope step-by-step mounted on said base; grooves made in each half-moulds in alignment with each other; holes formed by said grooves in the closed position of said half-moulds and intended for receiving the rope; a device for fluffing the rope at the designed locations of the cast pieces to reinforce the latter, said device being mounted on said base nearby said half-moulds and comprising: two members disposed oppositely to each other so as to be moved into the closed and the open positions, a mechanism for moving said members in the direction of movement of said half-moulds so as to close and open said members, grooves made in said two members, a hole formed by said grooves in the closed position of said members to receive the rope and adapted for fixing the rope while the latter is fluffed, said hole in said two members being aligned with said holes in the half-moulds, a portion of said two members disposed on their end facing said half-moulds; a mechanism for axially moving said two members, while they are closed, for introducing said portion of the members into one of said holes in said half-moulds including: a hinged-jointed parallelogram having two joints mounted on said two members, two other joints being mounted on the base, arms interconnected with said hinged joints, a power cylinder whose movable link is connected to one of the arms of said parallelogram for moving the latter, one of said holes in said half-moulds corresponding to the shape and size of said portion of the members that enters into said hole, and the other hole in said half-moulds being adapted for fixing the rope while the latter is fluffed, said device for moving the rope step-by-step including: guideways for the cast pieces, which guideways are mounted on said base, a slider mounted on said base and kinematically connected with said power cylinder of said device for fluffing the rope so as to be moved axially in said guideways, rope grippers mounted on said slider so as to be moved transversely to the direction of movement of said slider, and a means for moving said rope grippers.

7. A machine as claimed in claim 1, wherein the mechanism for moving said members in the direction of movement of the half-moulds includes two levers each having one arm spring-loaded with relation to the respective member along the direction of swinging, and the other arm, rigidly secured on a pivot turnable in said member, which pivot carries a roller eccentrically mounted thereon and acted upon by the respective half-mould while the latter is moved into the closed position.

8. A machine as claimed in claim 1, wherein said portion of the members, entering said hole in the half-moulds is made as the frustum of a cone with the smaller base facing said half-moulds.

9. A machine as claimed in claim 1, wherein the hole in the members and the hole in the half-moulds distant from the device for fluffing the rope are made with a diameter somewhat smaller than the diameter of the rope.

* * * * *